United States Patent [19]
Torii et al.

[11] Patent Number: 5,331,265
[45] Date of Patent: Jul. 19, 1994

[54] METHOD OF EXECUTING SLIDING-MODE CONTROL INCLUDING TWIST FEEDBACK

[75] Inventors: Nobutoshi Torii, Hachioji; Ryo Nihei; Tetsuaki Kato, both of Yamanashi, all of Japan

[73] Assignee: Fanuc Ltd., Minamitsuru, Japan

[21] Appl. No.: 32,404

[22] Filed: Mar. 12, 1993

Related U.S. Application Data

[63] Continuation of Ser. No. 743,343, Aug. 7, 1991, abandoned.

[30] Foreign Application Priority Data

Dec. 11, 1989 [JP] Japan ................... 1-320916

[51] Int. Cl.$^5$ .............................. G05B 5/01
[52] U.S. Cl. ............................ 318/610; 318/615; 318/685; 395/85; 364/162; 364/474.15
[58] Field of Search .............. 318/802, 685, 600–602, 318/611, 615, 620, 606–610; 395/80, 85, 95, 96; 364/148, 160–163, 176, 177, 474.15, 474.28, 474.35

[56] References Cited

U.S. PATENT DOCUMENTS

| | | | |
|---|---|---|---|
| 4,480,279 | 10/1984 | Hashimoto | 360/78 |
| 4,499,413 | 2/1985 | Izosimov et al. | 318/802 |
| 4,621,332 | 11/1986 | Sugimoto et al. | 364/513 |
| 4,713,596 | 12/1987 | Bose | 318/802 |
| 4,851,748 | 7/1989 | Daggett et al. | 318/568.2 |

FOREIGN PATENT DOCUMENTS

| | | |
|---|---|---|
| 57-189376 | 11/1982 | Japan . |
| 59-54085 | 3/1984 | Japan . |
| 62-84309 | 4/1987 | Japan . |

OTHER PUBLICATIONS

Dote, Y., "Digital Signal Processor (DSP)-based Variable Structure Control with Observer for Robot Manipulator", IECON'87, Proceedings of the 1987 International Conference on Electronics, Control and Instrumentation, Cambridge, Mass., Nov. 3–6, 1987, pp. 144–148.

Dote, Y. et al., "Microprocessor-based Novel Variable Structure control for Robot Manipulator", Automatic Control; World Congress 1987 (Selected Papers from the 10th Triennal World Congress of the I.F.A.C.O, Munich, Del., 1987, pp. 283–288.

Xu, J. et al., "Implementation of a VSS Control of Robotic Manipulators-Smoothing Modification", IEEE Transactions on Industrial Electronics and Control Instrumentation, vol. 36, No. 3, Aug. 1989, pp. 321–329.

Supplementary European Search Report, The Hague, Dec. 1, 1992.

Primary Examiner—William M. Shoop, Jr.
Assistant Examiner—Brian Sircus
Attorney, Agent, or Firm—Staas & Halsey

[57] ABSTRACT

A sliding mode including a process of feeding back an amount of twist for controlling a servo loop is controlled by reading the position of a servomotor and the position of a mechanical actuator drivable by the servomotor (SP1), calculating an amount of twist which is an error (SP2), calculating a switching surface Suf with a value produced by filtering the amount of twist (SP3), and selecting a switching input with the produced value (SP4, SP5, SP6). The amount of twist is filtered by a filter which has a numerator and a denominator which are of a first order. The filter allows a system to be realized which suffers less vibration and is robust against inertia fluctuations.

6 Claims, 3 Drawing Sheets

METHOD OF EXECUTING SLIDING-MODE CONTROL INCLUDING TWIST FEEDBACK

This application is a continuation of application Ser. No. 07/743,343, filed Aug. 7, 1991, now abandoned.

BACKGROUND OF THE INVENTION

1. Field of the Invention

The present invention relates to a method of executing a sliding-mode control including a process of feeding back an amount of twist of a robot, and more particularly to a method of executing a sliding-mode control including a process of feeding back an amount of twist, the method being capable of reducing vibration by changing switching surfaces with a value which is produced by filtering the amount of twist.

2. Description of the Related Art

Some mechanical systems have mechanical actuators, such as robot arms, which allow the inertia of applied loads to vary greatly depending on whether the robot arms, for example, are extended or contracted, and which include servomotors and associated mechanisms that have large speed reduction ratios. If those mechanical systems are controlled by the ordinary feedback control process, their responses are so slow that they are not practically feasible.

In view of the above drawback, it has been customary to measure the spring constant and viscosity term of a mechanical actuator, such as a robot arm, in various postures thereof, and calculate a dynamically variable feed-forward term according to the conventional linear control method on an on-line basis for feed-forward control of the mechanical system. The applicant has filed Japanese Patent Application No. 1-117518 on a sliding-mode control method in which a torque command value is varied depending on the fluctuation of the inertia of a robot. As well known in the art, sliding mode control which has been used in relay control since 1955, has been applied to many kinds of systems, including robot manipulators. The use of sliding mode control in a robot control system suppresses nonlinear interactions between servo systems due to Coriolis and centrifugal forces and automatically compensates for variations in mass at the hand or distal end of the robot manipulator.

The applicant has also filed Japanese Patent Application No. 1-253767, corresponding to U.S. patent application Ser. No. 07/687,902, on a sliding-mode control method which is an improvement over the above sliding-mode control method. According to the improved sliding-mode control method, a switching plane for sliding-mode control is varied depending on a twist or positional difference between a servomotor and a mechanical actuator which is driven by the servomotor, and a twisting speed, i.e., the speed at which such a twist occurs. As illustrated in FIGS. 3A and 3B, a manipulator may have an angle $\theta_t$ between lines $L_1$ and $L_2$ which respectively connect points $J_1$ and $J_2$, and joint $J_2$ to the actual position of end E of the manipulator. Due to twist, the angular position $\theta$ of the motor at joint $J_2$ may be different than $\theta_t$. As illustrated in FIG. 3B, the angular position $\theta$ of the motor may also differ from the commanded position $\theta_r$.

The above method is however disadvantageous in that it is necessary to establish a positional loop gain lower than a resonant frequency, and the servo rigidity is lowered.

SUMMARY OF THE INVENTION

In view of the aforesaid difficulties of the conventional sliding-mode control methods, it is an object of the present invention to provide a method of executing a sliding-mode control including a process of feeding back an amount of twist, the method being capable of reducing vibration by changing switching surfaces with a value which is produced by filtering the amount of twist, so that the rigidity is maintained at a high level for reduced vibration.

In order to accomplish the above object, there is provided in accordance with the present invention a method of executing a sliding-mode control including a process of feeding back an amount of twist for controlling a servo loop, comprising the step of effecting sliding mode control by changing switching surfaces with a value produced by filtering an amount of twist which is the positional difference between a servomotor and a mechanical actuator drivable by said servomotor.

The amount of twist is filtered by a filter which has a numerator and a denominator which are of a first order. The filter allows a system to be realized which suffers less vibration and is robust against inertia fluctuations.

DESCRIPTION OF THE PREFERRED EMBODIMENT

An embodiment of the present invention will hereinafter be described with reference to the drawings.

Figure 2:
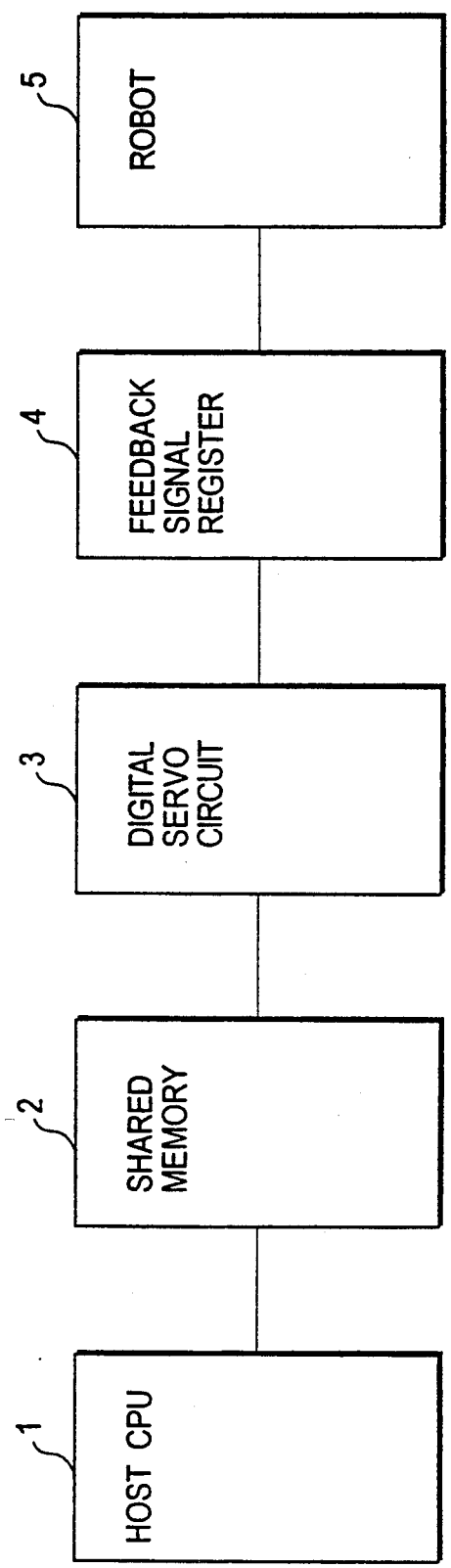
FIG. 2 is a block diagram of a servo control loop for a robot controlled by the method of the present invention.
Figure 3A:
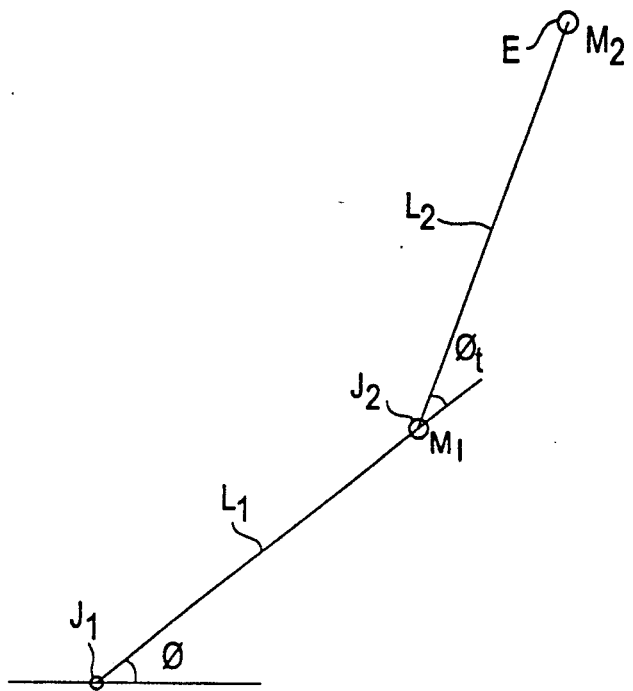
FIG. 3A is a schematic diagram of a two-joint robot manipulator.
Figure 3B:
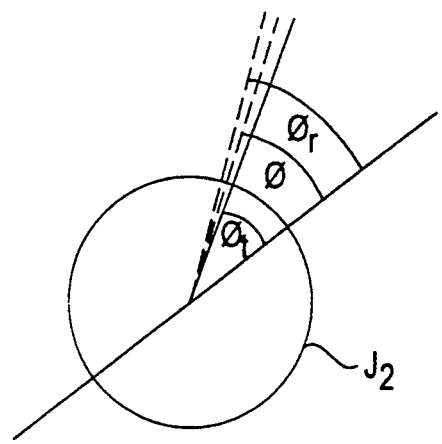
FIG. 3B is a schematic diagram of the second joint of the robot manipulator illustrated in FIG. 3A.

FIG. 2 shows a servo control loop for a robot controlled by the present invention. A host CPU 1 is a processor for controlling a robot control apparatus in its entirety. A ROM for storing a system program, a work RAM, etc., which are associated with the host CPU 1, are omitted from illustration. Position command values are written from the host CPU 1 into a shared memory 2. A digital servo circuit 3 for servo control is basically constructed of a DSP (digital signal processor). The digital servo circuit 3 reads a position command value from the shared memory 2 at a constant time interval, reads motor information from a feedback signal register 4, calculates a command for a servo system, and controls the positions, speeds, and currents of servomotors of respective axes in a robot 5. Various calculations for a sliding-mode control process, described below, are also carried out by the digital servo circuit 3.

Figure 1:
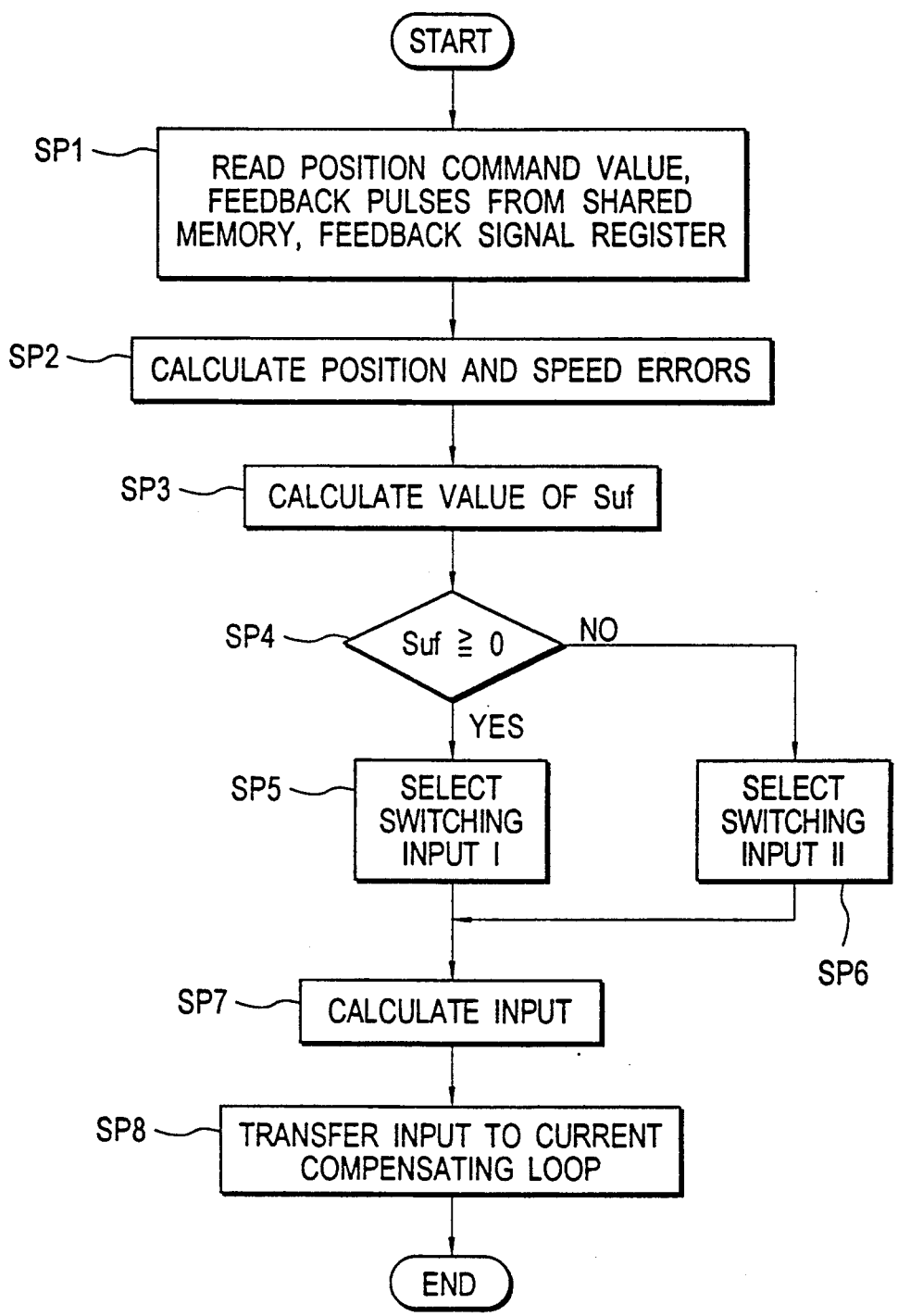
FIG. 1 is a flowchart of a method of executing a sliding-mode control including a process of feeding back an amount of twist according to the present invention.

FIG. 1 shows a flowchart of a method of executing a sliding-mode control including a process of feeding back an amount of twist according to the present invention. In FIG. 1, numerals following the letters "SP" represent the numbers of steps.

SP1: A position command is read from the shared memory 2, and feedback pulses are read from the feedback signal register 4.

SP2: Position and speed errors are calculated.

SP3: The value of a switching surface Suf is calculated. When calculating the switching surface Suf, an amount of twist is filtered. Details will be described later on.

SP4: If Suf is positive, then control goes to a step SP5, and if not, then control goes to a step SP6.

SP5: Since Suf is positive, a switching input I is selected. The switching input will be described in detail later on.

SP6: Since Suf is negative, a switching input II is selected. The switching input will be described in detail later on.

SP7: An input to a current compensating loop is calculated.

SP8: Transfer of the input to the current compensating loop is carried out.

According to a feature of the present invention, a value produced by specially filtering an amount of twist that is estimated by an observer is fed back to a switching surface in a sliding mode, for thereby realizing a robust system that is adaptable to inertia fluctuations in a spring system. Details will now be described below.

A formula for calculating the switching surface Suf is given by:

$$Suf = \epsilon^{(1)} + C^*\epsilon + D^* \int (\epsilon + C^*\epsilon) - K^*\{(S+C)/(S+A)\}(\theta - \theta t)$$

where $\{(S+C)/(S+A)\}$ is a term indicating a filter used in the present invention, and $(\theta - \theta t)$ an amount of twist. While a switching surface is generally represented by S, it is represented by Suf in this embodiment in order to avoid confusion between itself and an operator in Laplace transform. The various symbols in the above equation are defined as follows:

Suf: switching surface,
S: Laplace operator,
$\theta$: motor position,
$\theta r$: position command value,
$\theta t$: distal end position of the mechanical actuator, and
$\epsilon$: error in the position $(\theta r - \theta)$.

The control of a robot will now be considered. If it is assumed that the inertia of a robot is indicated by J and an input torque applied to the robot is indicated by T, then the following equation is satisfied:

$$J^*\theta^{(2)} = T \quad (1)$$

If $D = 0$ in the equation (1) for simplicity, then the following equations are satisfied:

$$Suf = \epsilon^{(1)} + C^*\epsilon - K^*\{(S+C)/(S+A)\}(\theta - \theta t) \quad (2)$$

$$T = J_o^*\omega_c^*\epsilon + J_o^*\omega_c^*C^*\epsilon^{(1)} + T1$$

where
T1: switching input,
$J_o$: expected minimum inertia,
$\omega_c$: constant which is determined subsequently, and
$\epsilon n$: $\theta - \theta t$.

When the following input is given, it is possible to reach a switching surface necessarily according to a control process including feed-forward control. Here, the newly added term $-K^*\{(S+C)/(S+A)\}\epsilon n$ will be described below. The other terms will be omitted.

If $T1 = K1(\epsilon) + K2(\theta r) + K6(\epsilon n) + K7(\epsilon n)$, then $K6(\epsilon n)$, $K7(\epsilon n)$ are new terms corresponding to a filter, and these terms will be described below. The other terms will be omitted as they are the same as those disclosed in the earlier Japanese Patent Application No. 1-253767.

(a) At the time $Suf \geq 0$ (the switching input I is selected in the step SP5 shown in FIG. 1), (ai) when $\epsilon n \geq 0$ relative to the term $K6(\epsilon n)$, $K6(\epsilon n) = 0$, when $\epsilon n < 0$ relative to the term $K6(\epsilon n)$, $K6(\epsilon n) = C^* (J_o - J_{MAX})^*K^*\{(S+C)/(S+A)\}^*\epsilon n$, (aii) when $\epsilon n^{(1)} \geq 0$ relative to the term $K7(\epsilon n)$, $K7(\epsilon n^{(1)}) = -J_o^*K^*\{(S+C)/(S+A)\}^*\epsilon n^{(1)}$, and when $\epsilon n < 0$ relative to the term $K7(\epsilon n)$, $K7(\epsilon n^{(1)}) = -J_{MAX}^*K^*\{(S+C)/(S+A)\}\epsilon n^{(1)}$.

(b) At the time $Suf < 0$ (the switching input II is selected in the step SP6 shown in FIG. 1), (bi) when $\epsilon n \geq 0$ relative to the term $K6(\epsilon n)$, $K6(\epsilon n) = C^* (J_o - J_{MAX})^*K^*\{(S+C)/(S+A)\}^*\epsilon n$, when $\epsilon n < 0$ relative to the term $K6(\epsilon n)$, $K6(\epsilon n) = 0$, (bii) when $\epsilon n^{(1)} \geq 0$ relative to the term $K7(\epsilon n^{(1)})$, $K7(\epsilon n^{(1)}) = -J_{MAX}^*K^*\{(S+C)/(S+A)\}\epsilon n^{(1)}$, and when $\epsilon n^{(1)} < 0$ relative to the term $K7(\epsilon n^{(1)})$, $K7(\epsilon n^{(1)}) = -J_o^*K^*\{(S+C)/(S+A)\}^*\epsilon n^{(1)}$.

When the switching input T1 is applied depending on the value of Suf, it becomes possible to effect a control process while suffering less vibration, without lowering the servo rigidity even if the inertia varies.

It will hereinafter be proven that $\epsilon n$, $\epsilon n^{(1)}$ are effective to dampen vibrations of a spring model of a robot. When Suf becomes 0 in response to the above input, the following equation is satisfied:

$$0 = \epsilon^{(1)} + C^*\epsilon - K^*\{(S+C)/(S+A)\}^*\epsilon n^{(1)}.$$

Substituting $$n = \theta r - \theta,$$

$$\epsilon^{(1)} = \theta r^{(1)} - \theta^{(1)},$$

and $$\epsilon n: \theta - \theta t,$$

subjecting the both sides to Laplace transform, and rearranging them, the following equation is obtained:

$$(S + C)\theta_r = (S + C + K)\theta - K^*\{(S + C)/(S + A)\}^*\theta t. \quad (3)$$

A spring system is introduced, and it is assumed that constants of the spring system, which is primarily a speed reducer, are defined as follows:

Bk: damping term,
Kc: spring constant, and
Jt: load inertia beyond the speed reducer.

With respect to the spring system, the following equation is satisfied:

$$(\theta t/\theta) = (BkS + Kc)/(JtS^2 + BkS + Kc) \quad (4)$$

(since Bk and Kc are small in general robots, they have poor damping and vibrate at low frequency). Solving the equation (4) for $\theta$, putting it into the equation (3), and rearranging the same, the following equation is obtained:

$$(\theta t/\theta r) = (BkS + Kc)/\{JtS^2 + BkS + Kc + KJtS^2/(S+A)\}.$$

If a is reduced (specifically to the extent that (S+A) can be regarded as S at the resonant frequency of the above spring system), then the above equation can be rewritten as:

$$(\theta t/\theta r)=(BkS+Kc)/\{(JtS^2+(Bk+KJt)S+Kc\}.$$

K represents a damping term, indicating that there is a vibration damping effect.

It will now be proven that adaptability is compensated for by the switching input. By assuming $\epsilon n=\{(S+C)/(S+A)\}*\epsilon n$, the following equations are obtained:

$$Suf=\epsilon^{(1)}+C^*\epsilon-K^*\epsilon n \quad (5) \text{ (switching surface)}$$

$$T=J_o^*\omega_c^*\epsilon^{(1)}+J_o^*\omega_c^*C^*\epsilon+T1 \quad (6) \text{ (input)}.$$

In the above equations, the symbols are defined as follows:
T1: switching input,
$J_o$: expected minimum inertia,
$\omega_c$: constant which is determined subsequently, and
$J^*\theta^{(2)}=T \ldots (7)$ (object to be controlled).
If $\epsilon=\theta r-\theta$, then the following equations are established:

$$\epsilon^{(1)} = \theta_r^{(1)} - \theta^{(1)}, \text{ and} \quad (8)$$

$$\epsilon^{(2)} = \theta_r^{(2)} - \theta^{(2)}$$

where
$\theta_R$: position command value, and
$\theta$: position which is fed back.
Now, the equation:

$$V=\tfrac{1}{2}*S^2$$

is considered as a Lyapunov function candidate (The minimum value of V is 0. If V<0, then V converges to the minimum value of 0 as it monotonously decreases. Therefore, S always converges to 0, and the response is determined by a constant response function with Suf=0).

From the equation (5), the following equation is satisfied:

$$Suf^{(1)}=\epsilon^{(2)}+C^*\epsilon^{(1)}-K^*\epsilon n^{(1)} \quad (9).$$

When the equation (8) is substituted into the equation (7), and the resultant equation is rearranged, the following equation is obtained:

$$\epsilon^{(2)}=\theta_r^{(2)}-T/J \quad (10).$$

When the equation (6) is substituted into the equation (10), and the resultant equation is rearranged, the following equation is obtained:

$$\epsilon^{(2)}=\theta_r^{(2)}-J_o^*\omega_c^*\epsilon^{(1)}/J-J_o^*\omega_c^*C^*\epsilon/J-T1/J \quad (11).$$

When the equation (11) is substituted into the equation (9), and the resultant equation is rearranged, the following equation is obtained:

$$Suf^{(1)}=(C-\omega_c^*J_o/J)^*\epsilon^{(1)}-J_o/J^*\omega_c^*C^*\epsilon-K^*\epsilon n-T1/J+\theta_r^{(2)}) \quad (12).$$

When the equation (5) is solved for $\epsilon^{(1)}$, the following equation is obtained:

$$\epsilon^{(1)}=S-C^*\epsilon+K^*\epsilon n^{(1)}.$$

When this equation is substituted into the equation (12), and the resultant equation is rearranged, the following equations are obtained:

$$Suf^{(1)} = (C - \omega_c^*J_o/J)^*S - C^{2*}\epsilon +$$
$$(C - J_o/J^*\omega_c)^*K^*\epsilon n - K^*\epsilon n^{(1)} - T1/J + \theta_r^{(2)},$$

and $$V^{(1)} = S^*S^{(1)} = (C - \omega_c^*J_o/J)^*S^2 -$$
$$[C^{2*}\epsilon - (C - J_o/J^*\omega_c)^*K^*\epsilon n + K^*\epsilon n^{(1)} + T1/J - \theta_r^{(2)}]^*S.$$

If $\omega_c=C^*J_{MAX}/J_o$, then the following inequality is satisfied:

$$(C-\omega_c^*J_o/J)^*S^2<0.$$

In order to satisfy the inequality:

$$V^{(1)}<0 \text{ at all times,}$$

the switching input T1 is determined so as to satisfy the following inequality:

$$-[C^{2*}\epsilon-(C-J_o/J^*\omega_c)^*K^*\epsilon n+K^*\epsilon n^{(1)}T1/J-\theta_r^{(2)}]^*S<0,$$

and only the vibration part is taken out, thus achieving the result described above.

While the present invention has been described with reference to a mechanical actuator for a robot by way of example, the present invention is also applicable to any of various other mechanisms which are driven by servomotors.

With the present invention, as described above, an amount of twist is subject to filtering to realize a servo system which suffers less vibration and is capable of well responding to commands without sacrificing the rigidity. As a consequence, there can be realized a robot which follows paths with high accuracy and suffers less vibration when moving at steady speed and less residual vibration when brought to a stop.

What is claimed is:

1. A method of executing sliding-mode control of a servomotor, comprising the steps of:
   (a) feeding back an amount of twist, representing a positional difference between a servomotor and a mechanical actuator drivable by the servomotor, to a servo loop of the servomotor; and
   (b) performing sliding-mode control of the servomotor with switching surfaces selected by filtering the amount of twist by a filter having a characteristic represented by a numerator and a denominator which are of a first order with respect to a Laplace operator.

2. A method according to claim 1, further comprising the step of obtaining the amount of twist from estimation by an observer for feeding back in step (a).

3. A method according to claim 1, wherein a robot is controlled by said sliding-mode control.

4. A method according to claim 3, wherein said mechanical actuator is an arm of said robot.

5. A method of executing sliding-mode control of a servomotor controlling movement of a mechanical actuator, comprising the steps of:

(a) reading a commanded position from a shared memory;

(b) obtaining a servomotor position;

(c) obtaining a position error between the commanded position and the servomotor position, a differential of the position error and an amount of twist representing a positional difference between the servomotor position and an actuator position of the mechanical actuator;

(d) filtering the amount of twist by a filter having a characteristic represented by a numerator and a denominator which are of a first order with respect to a Laplace operator;

(e) calculating a switching surface value from the position error and the differential of the position error obtained in step (c) and the amount of twist after said filtering in step (d);

(f) selecting a switching input in accordance with the switching surface value;

(g) calculating an input to a current compensating loop controlling the servomotor in dependence upon the switching input selected in step (f); and (h) transferring the input to the current compensating loop.

6. A method according to claim 1, wherein said obtaining in step (c) comprises obtaining the amount of twist from estimation by an observer.

* * * * *

UNITED STATES PATENT AND TRADEMARK OFFICE
CERTIFICATE OF CORRECTION

PATENT NO. : 5,331,265

DATED : July 19, 1994

INVENTOR(S) : Torii et al.

It is certified that error appears in the above-identified patent and that said Letters Patent is hereby corrected as shown below:

Title page, [75] Inventors: change "Hachioji" to --Tokyo--.

Col. 8, line 14, change "claim 1," to --claim 5,--.

Signed and Sealed this

Fifteenth Day of November, 1994

Attest:

BRUCE LEHMAN

Attesting Officer

Commissioner of Patents and Trademarks